Oct. 26, 1926.  1,604,651
F. W. MANNING
PROCESS OF AND APPARATUS FOR CONTINUOUS COUNTER CURRENT PRESSURE FILTRATION
Filed April 2, 1925  3 Sheets-Sheet 1

Inventor
FRED W. MANNING
By
Davey, Strong Townsend & Loftus
Attorneys

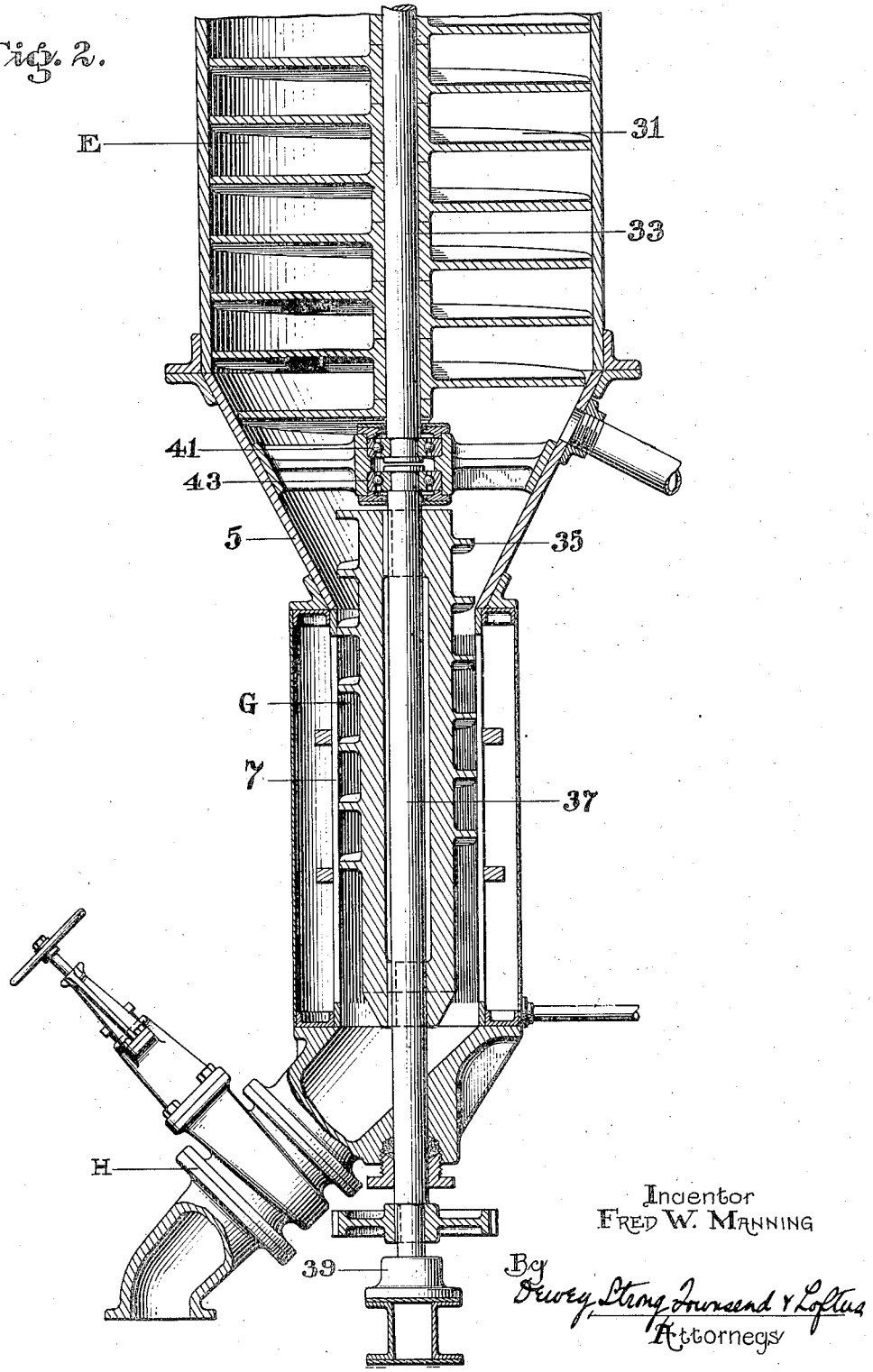

Oct. 26, 1926. 1,604,651
F. W. MANNING
PROCESS OF AND APPARATUS FOR CONTINUOUS COUNTER CURRENT PRESSURE FILTRATION
Filed April 2, 1925   3 Sheets-Sheet 3
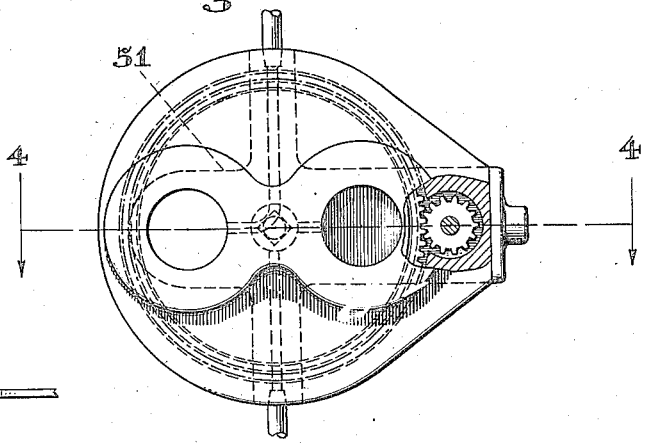
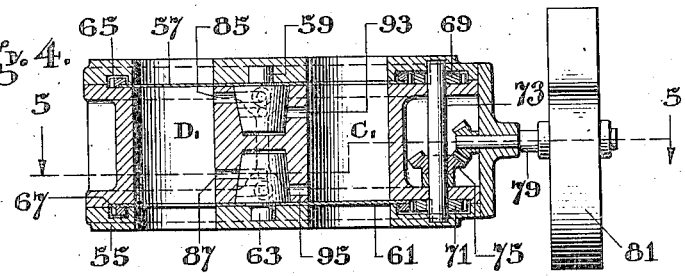
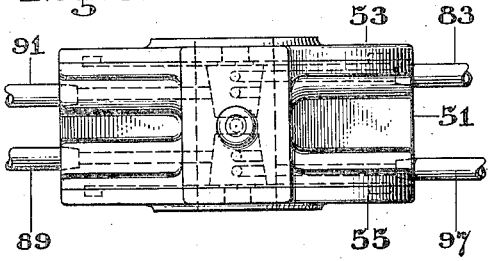
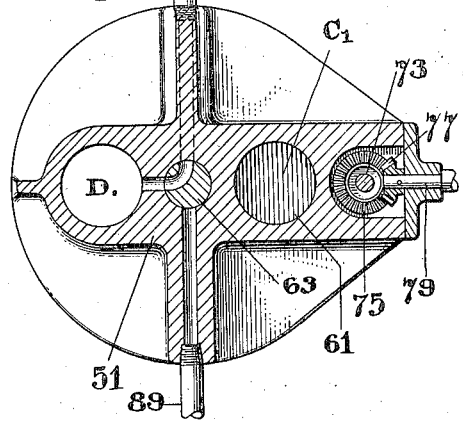
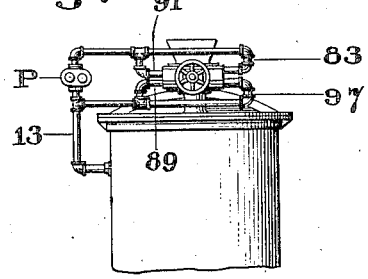
Inventor
FRED W. MANNING
By Dewey, Strong, Townsend & Loftus
Attorneys Patented Oct. 26, 1926.

1,604,651

UNITED STATES PATENT OFFICE.

FRED W. MANNING, OF BERKELEY, CALIFORNIA.

PROCESS OF AND APPARATUS FOR CONTINUOUS COUNTER-CURRENT PRESSURE FILTRATION.

Application filed April 2, 1925. Serial No. 20,155.

This invention relates to improved filtering processes and to apparatus for carrying the same into practice. Such processes are applicable to the purification of liquids such as sugar liquors, oils, etc., as by bleaching decolorization, clarification, filtration, etc., to the separation or precipitation of solids from liquids, the extraction of values from solids, and to operations of a like nature. My invention as disclosed herein relates particularly to processes of and apparatus for the continuous introduction of solids into liquids under pressure and to their separation, wherein the solids co-act with the liquids for the purpose of diffusion, extraction, catalysis, purification, revivication, precipitation of solids from liquids, water softening by means of exchange silicates or zeolites and for other treating purposes. The primary object of the invention is to provide a process and apparatus for performing these functions with greater facility and efficiency than has been done heretofore.

It has been the practice heretofore to accomplish these purposes by passing a liquid or fluid through the solids while the solids are held stationary in a suitable receptacle, or else by bringing the liquid and solids together in tanks usually open to the atmosphere and then separating them by means of the filter walls of continuous suction or intermittent pressure filters on which the solids are sometimes further treated by the passing of suitable liquids or fluids through them, but in any case the solids are held stationary on and relative to the filter wall resulting in either an intermittent operation or else an incomplete and unsatisfactory removal of the solids by scraping.

As distinguished from such prior methods, the present invention includes the advantages of the continuous operation of the suction filter and the higher pressures of the intermittent filter and other desirable features of both types of filters, and also involves a counter current chamber by means of which the amount of the washes may be greatly decreased, the washes maintained at uniform and concentrated strength, the values of the treating agents completely utilized, mixing tanks eliminated, etc., all as disclosed in my copending applications Serial No. 689,178, filed January 28, 1924, Serial No. 747,431, filed November 3, 1924, and Serial No. 751,058, filed November 20, 1924. In addition the present invention discloses how a treating agent may be continuously introduced into a filter chamber and kept separate from the liquid to be filtered until after a coating has been formed on the filter wall, or several different treating agents for different purposes such as for decolorizing and clarifying, may be introduced into liquids under pressure and kept separate until the filter wall has been first precoated with the clarifying or other treating agent, which is then moved forward continuously until the decolorizing or other treating solids begin to build upon it after which both are moved on through the apparatus together. The purpose of the precoating is for clarifying purposes, to protect the filter wall from more abrasive solids, to keep the filter wall clean, to aid in the forward movement of the filter cake solids, and to speed up the rate of filtration, but it may be used for other purposes. Attention is also directed to my co-pending application, Serial No. 37,600, filed June 17, 1925, relating to this subject matter.

In the accompanying drawings I have shown and in this specification described in detail a preferred form of apparatus for carrying out my invention. It is to be understood, however, that the improved process is not limited to the particular apparatus employed and that, so far as the invention relates to the apparatus, the specific disclosure in the drawings is for the purpose of exemplification only, the scope of the invention being defined in the following claims.

In the drawings:

Fig. 2 is a sectional elevation of the lower end thereof.

Fig. 3 is a plan view of the feeding valve with a portion of the cover plate broken away to show the gearing drive of the rotating disc.

Fig. 4 is a sectional elevation on line 4—4 of Fig. 3.

Fig. 5 is a sectional plan view on line 5—5 of Fig. 4.

Fig. 6 is a view looking toward the right hand end of Fig. 4.

Fig. 7 is a diagrammatic view of the piping arrangement between the cloudy filtrate pipe, pump and feeding valve.

Fig. 8 is a fragmentary view showing the connection of the annular gear to the rotating disc.

Fig. 9 is a perspective view of the suction and discharge controlling cock.

Figure 1:
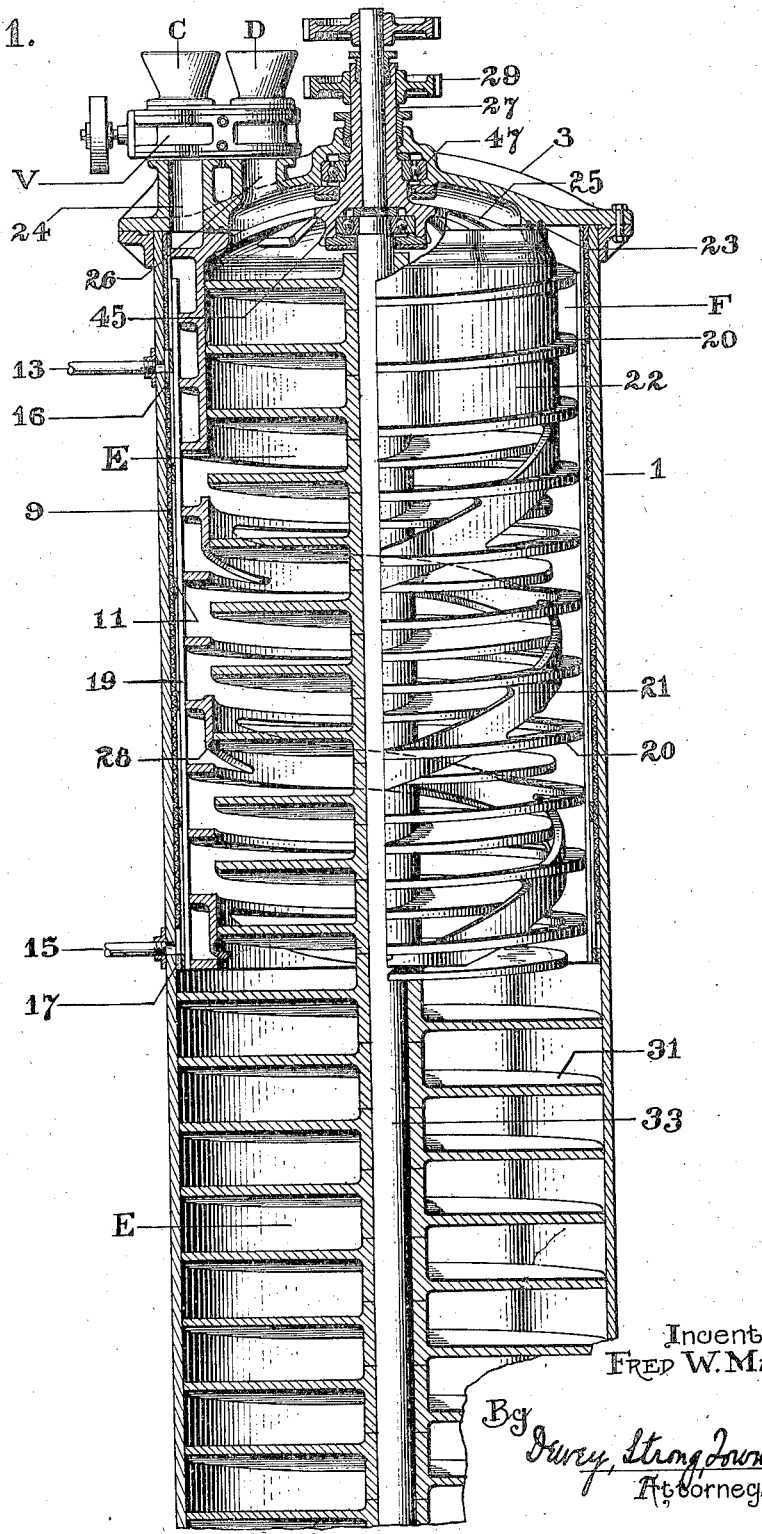
Fig. 1 is a sectional elevation of the upper end of the apparatus.

The apparatus as shown in Figs. 1 and 2 consists of a feeding valve V with receiving hoppers C and D, through which the treating or other solids are introduced respectively into the filter chamber F, and the counter-current chamber E. As illustrated, the filter chamber surrounds the upper end of the counter current chamber, and in either or both of these chambers the treating solids and liquid or fluid act upon one another. The counter-current chamber E extends downwardly into a compression chamber G, from which the solids are discharged through a valve or cock connection H into a succeeding similar apparatus, as disclosed in my co-pending application, Serial No. 747,431. The process and apparatus herein are similar in general to that disclosed in such application, and reference thereto may be made for details not specifically described herein.

The tank shell 1 may extend from cover plate 3 to the conical entrance 5 of the compression chamber 7. Its upper end is lined with a suitable wire screen, crimped plate or other suitable means 9 to give drainage to the filter wall 11 which may be a metal filter fabric with a smooth surface but for most purposes a plate with slots 5/1000" to 10/1000" in width suitably spaced and staggered will be found best. The spacing of the slots or perforations will depend largely upon the depth of cake solids to be built up but for most purposes a spacing of 1/8" to 3/8" will be found suitable. If desirable, the drainage screen or plate may be dispensed with and the drainage obtained by grooving the back of the filter plate coincident with the slots as described in my copending application Serial No. 751,058.

Pipe 13 is the outlet for the cloudy filtrate and pipe 15 for the clear filtrate. To prevent the cloudy filtrate from contaminating the clear filtrate through the drainage member, a ring of metal or soft packing 16 may be interposed between the filtering wall 11 and the tank shell 1 just below the cloudy filtrate outlet. A similar ring 17 may be placed just below the clear filtrate outlet to close the drainage connection from the counter-current chamber. Guide bars 19 for the cake solids may be attached to the filtering wall 11 in a vertically placed position to prevent any rotation of such solids.

The upper portion of the spiral feeding screw 20 is rigidly carried on the periphery of a cylindrical member 22 carried by a spider 25. This member 22 is open only at its upper and lower ends. The portion of the screw 20 below the member 22 is connected to and carried by such member.

A minimum thickness of cake solids to given clarity and maximum filtering rates is maintained, and the flights of the feeding screw held rigid by means of spirally arranged tie bars 21 with sharpened lower edges 28. These spirally arranged tie bars when shearing the inner surface of the cake solids also assist in the downward movement of the solids.

The closed shell member 22 of the upper end of the feeding screw 20 together with the soft packing 23 prevents the two treating solids which enter through nozzles 24 and 26 from coming in contact with each other until after the coating is formed on the filtering wall. The feeding screw is driven through the spider 25, hollow shaft 27 and spur gear 29. The flights 31 of the counter-current screw are mounted on shaft 33 and extend upward inside of the feeding screw. The compression screw 35 operating inside of compression chamber G is keyed to shaft 37. The filter cage 7 of the compression chamber G may be a suitable slotted pipe or it may be a pipe lined with a suitably slotted plate and drainage member as described above for the filter chamber. The footstep bearing 39 and ball bearing 43 take the end and radial thrusts of compression shaft 37. Ball bearings 41 and 45 take the end and radial thrusts of the counter-current shaft 33 and ball bearing 47 takes the radial and end thrust of the feeding screw 20.

The details of my feeding valve V are shown in Figures 3 to 9. In these figures, 51 indicates the valve body, 53 the top cover plate, 55 the bottom cover plate, 57 the top rotating disc to which discharge cock 59 is non-rotatably connected and 61 the bottom rotating disc to which the suction cock 63 is non-rotatably connected. The rotating discs may be made of hardened steel plates 3/16" or 1/4" in thickness and to their rims are attached annular gears 65 and 67 driven by smaller spur gears 69 and 71 through shaft 73, bevel gears 75 and 77, and shaft 79 by a pulley 81. The valve body and cover plates may have one or two or even more receiving pockets and these pockets should be coincident with one another but the rotating discs have only one opening in each. In the present case I have shown a suitable arrangement when two receiving pockets are to be used for two different treating agents. The valve body 51 is provided therethrough with two diametrically opposite receiving pockets C' and D' respectively beneath the hoppers C and D shown in Fig. 1. Cooperating openings are formed coincident therewith through the cover-plates 53 and 55, as illustrated in Fig. 4. Receiving pocket C' may be used for a clarifying agent and pocket D' for a decolorizing agent, and these solids introduced into the pockets through the hoppers C and D when the opening through the upper disc 57 is coincident with such openings.

The arrangement of the openings in cocks, discs, and valve body is such that when the openings in the bottom disc 61 becomes coincident with pocket D' in the valve body, the contents of D' will be flushed out into the counter-current chamber by means of liquid or fluid forced by the pump P through the pipe 83 and opening 85 in the valve body. As soon as the rotation of bottom disc 61 closes the outlet, the liquid contents of D' will be drawn out by the pump suction through the opening 87 in the valve body and pipe 89.

Similarly when the opening in the bottom disc 61 becomes coincident with pocket C' in the valve body, the solid contents of C' will be flushed out into the filter chamber by means of liquid or fluid pressure from pump P through pipe 91 and opening 93 in the valve body. As soon as the bottom disc outlet from C' closes, the liquid contents of C' will be withdrawn by means of pump P through the opening 95 in the valve body and pipe 97. It will thus be clearly seen that while one opening is receiving its charge of treating solids, the contents of the other opening is being discharged and that the pump alternatively flushes out the contents of the valve pockets which action is followed by the alternative sucking out or exhausting of their liquid or fluid contents.

This liquid content of the valve pockets, as well as the cloudy filtrate from the filter chamber, is liquid which has already been treated by counter-current action and therefore should be returned to the counter current or the filter chamber. This is accomplished by connecting the suction lines 89 and 97 of the valve pockets and the cloudy filtrate outlet 13 to the pump suction and returning the liquid to the filter or counter-current chamber by using it to flush through the valve pockets at a slightly higher pressure than the pressure of the liquid in the counter-current chamber.

The operation of the apparatus thus constructed has been in part indicated in connection with the foregoing description. The treating solids, as for instance a clarifying agent such as kieselguhr and a decolorizing agent such as fuller's earth, bone char or vegetable carbon, are fed continuously into hoppers C and D. With the rotation of the discs, pocket C' receives a charge of clarifying or other precoating solids at approximately the same time that a charge of decolorizing or other treating solids is being flushed out of the pocket D' through nozzle 26 into the counter-current chamber E, and pocket D' receives a charge of decolorizing solids at the same time that the charge of clarifying solids is being flushed out of pocket C' through nozzle 24 into the filter chamber F. After the treating solids have been flushed from one of the pockets the pocket remains filled with the flushing liquid or fluid. This liquid is immediately removed by means of the pump suction in order that the pocket may again be ready to receive a fresh charge. If desirable, air or other fluid such as steam may be used for flushing purposes in which case the suction cock will relieve the pressure from the pockets without the aid of the suction pipes 89 and 97 and pump P. This method of charging the valve with solids and discharging the valve of solids is applicable to many types of valves.

When the coating, or precoating, solids are flushed into the filter chamber F, the flushing liquid begins to filter outwardly through the filter wall due to the pressure of the flushing liquid or the suction of the pump P or both. The solids thereupon build up a thin coating on the wall and the resulting cloudy filtrate is returned as above described to the filter chamber as a flushing medium through the feeding valve. The higher pressure at which the flushing fluid passes through the valve not only makes it possible for all the cloudy filtrate to be returned but it also prevents the lower pressured liquid in the counter-current chamber rising to the upper end of the filter chamber. The liquid may also be prevented from rising by the complete filling and if necessary packing with coating solids of the annular space between the filter wall and the cylindrical member 22. The coating is moved downwardly by the rotation of the feeding screw 20, until as it approaches the bottom of member 22 the liquid from the counter-current chamber begins to filter through it and the liquid solids to build up upon it resulting in the final treatment of and complete separation of the solids from the liquid. The clear filtrate is carried off through pipe 15. After the filter cake of the now combined treating solids has reached a depth equivalent to the width of the feeding screw 20, a greater depth with consequent lowering of filtering rate is prevented by the shearing edge of the spirally arranged tie bars which are rigidly attached to the inner edge of the feeding screw 20. If desired, the treating solids may be allowed to completely fill the annular space between the filter wall and cylindrical member 22 and further treating solids prevented from building thereupon. The filter cake, after having travelled the entire length of the filter wall 11, is now broken up by the counter-current screw and with the usually greater portion of the treating solids which have not been allowed to build upon the filter cake, is passed on through the counter-current chamber by means of the same screw. The solids on leaving the counter current chamber pass through the conical entrance 5 into the compression chamber 7 where the solids are collected or compressed and are finally passed out through valve H into a succeeding and similar section to the one above, the liquid from the compression chamber being drawn off at 21. The liquid to be treated and filtered enters cone 5 through a pipe 14 and passes through the filtering flights of the counter current screw in counter direction to the movement of the solids and is thereby intimately contacted and treated by such solids. On reaching the upper end of the counter current chamber enclosed by cylindrical member 22 the liquid is thoroughly mixed with fresh decolorizing or other treating solids entering through nozzle 26 after which it is forced through filter wall 11 and the clarifying or other treating solids moving thereupon.

If the treating agents should be of a light, fluffy nature, and consequently difficult to feed through the feeding valve in a dry state, they may be continuously mixed with a portion of the cloudy filtrate and then either fed through the feeding valve as a thick cream or else pumped in liquid form into the apparatus through nozzles 24 and 26 without passing through the feeding valve. Or one agent may be mixed with a portion of the cloudy filtrate and fed through the feeding valve or pumped through its corresponding nozzle without passing through the feeding valve and the other agent flushed through the feeding valve and corresponding nozzle by means of another portion of the cloudy filtrate.

In the case of my copending application Serial No. 751,058, the clarifying or other treating agent may be fed through one valve pocket and the pulp solids through one or more pockets. The air or other fluid pressure not only can be used as the necessary flushing fluid for both clarifying agent and pulp solids but by means of the flushing operation may be used to supply a practically steady continuous pressure in the compression chamber for the purpose of forcing the expressed juices through the treating agent. In such a case the expelling and clarifying apparatus would be similar to the present invention without the counter-current chamber; the compression screw extending into and being surrounded by the feeding screw and filter chamber, the feeding screw extending downwardly only as far as its closed cylindrical portion, and the pulp solids being built up on the clarifying solids as the latter moved below the closed cylindrical feeding screw after which the two would be discharged together.

Also, when the solids already exist in the liquid a counter-current chamber may not be required in which case the liquid or sludge may be pumped through nozzle 26 and the clarifying or other treating solids may be fed through feeding valve and nozzle 24.

It will thus be seen that my feeding valve is adaptable for many purposes. Its speed may be varied to suit conditions. It may have any number of receiving pockets. If the supply of solids to the hopper fail, there can be no escape of liquid or fluid from the apparatus or loss of pressure in the apparatus. There will be little wear to the hardened steel discs and never any leakage, due to the pressure causing them to move tightly against their seats. Furthermore, the continuous flushing of the solids through the valve into the apparatus and the movement of the upper end of the counter-current screw make unnecessary the use of a mixing tank.

It will also be evident that by coating a filter wall with suitable solids, undesirable impurities in the liquid may be completely eliminated during filtration, which could not be eliminated by simply filtering the liquid through a deposition of the liquid solids; slimy deposits from the liquid tend to clog the filter wall and to turn with the feeding screw but if deposited on a granular precoating would result in a forward movement of the cake solids and a clean filter wall; wear of the filter wall by the forward movement of abrasive solids may be prevented by a precoating of softer solids; a porous precoating may greatly increase the rate of filtering; and when desirable, the liquid solids may be passed on through the apparatus without any portion of the liquid solids being allowed to build up on the moving coating of treating solids on the filter wall.

It will also be apparent that the minimum thickness of cake solids to give clarity and maximum filtering rates, may be at all times maintained and that the excess of cake solids may not only be continually sheared off without disturbance to the remainder of the cake solids but the shearing action may aid materially in the forward movement of the cake solids.

Having thus described my invention, what I claim and desire to secure by Letters Patent is:—

1. A continuous treating and filtering process consisting of continuously coating a portion of the filter wall, out of contact with the liquid to be filtered, with a treating solid and continuously moving such coating bodily over the wall while in contact therewith and into contact with said liquid which thereupon passes through the coating of solids and filter wall.

2. A continuous treating and filtering process consisting of continuously precoating a portion of the filter wall with a treating solid out of contact with the liquid to be filtered, and continuously moving such precoating bodily over the wall while in contact therewith and into contact with a liquid to be treated, whereupon solids in the liquid build up on the precoating, the liquid being continuously treated by passing through the built-up solids, precoating and wall.

3. A continuous treating and filtering process consisting of continuously precoating a portion of the filter wall with a treating solid out of contact with the liquid to be filtered, continuously moving such precoating bodily over the wall while in contact therewith and into contact with liquid to be treated, and permitting the liquid solids to build up only to a predetermined thickness on the precoating, the liquid being continuously treated by passing through the built-up solids, precoating and wall.

4. A continuous treating and filtering process consisting of feeding treating solids under pressure into a closed filter chamber having a permanent filter wall therein, of continuously building up such solids into a coating on the filter wall, of bringing the exposed surface of such coating and the liquid to be treated into contact after the coating has been formed on the unexposed portion of the filter wall, and continuously passing the liquid through such coating of cake solids.

5. A continuous treating and filtering process consisting of feeding treating solids under pressure into a closed filter chamber having a permanent filter wall therein, of continuously building up such solids into a uniform coating on the filter wall, of feeding other treating solids under pressure into a chamber containing the liquid to be treated, of bringing the exposed surface of said coating and the liquid into contact, after the coating has been formed on the unexposed portion of the filter wall and the liquid has been treated with the said other treating solids and continuously passing the liquid through such built-up wall of cake solids.

6. A continuous treating process consisting of feeding treating solids under pressure into a filter chamber having a filter wall therein, of continuously precoating the filter wall with the said treating solids, and continuously moving such precoating bodily over the filter wall while in contact therewith and into contact with a liquid to be treated whereupon solids in the liquid build upon the precoating, the liquid being continuously treated by passing through the built-up solids, precoating and wall.

7. A continuously treating process consisting of feeding treating solids under pressure into a filter chamber having a filter wall therein, of continuously precoating the filter wall with the said treating solids, of feeding other treating solids under pressure into a chamber containing the liquid to be treated, of continuously moving said precoating bodily over the filter wall while in contact therewith and into contact with the said liquid and permitting the said other treating solids to build up on the precoating, the liquid being continuously treated by passing through the built-up solids, precoating and wall.

8. In combination, a member having a cylindrical filter wall chamber therein, a cylindrical member on the inside thereof and at one end of the chamber and spaced from the filter wall, such member being open only at its ends, spiral feeding means between the said cylindrical member and said filter wall, and means for feeding treating solids into the cylindrical member through one end thereof.

9. In combination, a member having a cylindrical filter wall chamber therein, a cylindrical member on the inside thereof and at the upper end of the chamber and spaced from the filter wall, such member being open only at its ends, a spiral feeding means carried by the said cylindrical member between the member and said filter wall, spiral feeding means carried by and below the member adjacent to the wall, and means for feeding treating solids into the cylindrical member through one end thereof.

10. In combination, a cylindrical filter wall chamber, spiral feeding means adjacent the wall, spiral shearing means carried by the feeding means to shear off solids built up on the wall, and other spiral feeding means disposed centrally within the chamber.

11. In combination, a filter wall chamber, a valve for feeding treating solids into the chamber under pressure, means for flushing the solids through the valve into the chamber, and means whereby the solids are built into a filter cake on said wall.

12. In combination, a filter wall chamber, a valve for feeding treating solids into the chamber under pressure, means whereby the solids are built into a filter cake on the filter wall, and means for flushing the solids through the valve into the chamber by the cloudy filtrate passing through the portion of the wall on which the filter cake solids is being built.

13. In combination, a filter wall chamber, a valve for feeding treating solids under pressure into the chamber adjacent to the wall, means whereby the solids are built into a precoating filter cake over the filter wall, a valve for feeding other treating solids under pressure into a portion of the chamber out of communication with the said precoating portion of the wall, and means for flushing the solids through the valves into the chamber.

14. A valve for feeding solids into a fluid under pressure, comprising the combination of a body member having a receiving pocket therein, means for alternately exposing said pocket to a charging position and discharging position, and means automatically operated in timed relation with the valve movements for flushing out the pocket when the pocket is in discharging position.

15. A valve for feeding solids under pressure, comprising the combination of a body member having a receiving pocket therethrough, means for alternately opening and closing the outer and inner ends of the pocket, means for flushing out the pocket, and means automatically operated in timed relation with the first means for providing flushing communication to the pocket when the said outer end is closed and the said inner end is open.

16. A valve for feeding solids under pressure, comprising the combination of a body member having a receiving pocket therethrough, means for alternately opening and closing the outer and inner ends of pocket, means for flushing out the pocket and thereafter exhausting the flushing fluid remaining in pocket after closure of its inner end, and means automatically operated in timed relation with the first means for providing flushing communication to the opening when the said outer end is closed and the said inner end is open and thereafter providing exhausting communication to the opening when the said inner end is closed.

17. A valve for feeding solids into a fluid under pressure comprising the combination of a body member having a plurality of receiving pockets therethrough, means for alternately opening and closing the outer and inner ends of one pocket and closing and opening the outer and inner ends of another pocket so that the outer ends of no two of such pockets are open simultaneously and the inner ends of no two of such pockets are open simultaneously, and means for flushing out the pockets automatically in timed relation with the first means.

18. A valve for feeding solids into a fluid under pressure, comprising the combination of a body member having a plurality of receiving pockets therethrough, means for alternately opening and closing the outer and inner ends of one pocket and closing and opening the outer and inner ends of another pocket so that the outer ends of no two of such pockets are open simultaneously and the inner ends of no two of such pockets are open simultaneously.

FRED W. MANNING.